United States Patent
MacDonald

(10) Patent No.: US 6,594,026 B2
(45) Date of Patent: *Jul. 15, 2003

(54) SOFTWARE-CONTROLLED PRINTER/PERFORATOR UNIT

(76) Inventor: Alaster MacDonald, 21 W. Kirke St., Chevy Chase, MD (US) 20815

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,299

(22) Filed: Sep. 14, 1998

(65) Prior Publication Data

US 2002/0113986 A1 Aug. 22, 2002

(51) Int. Cl.[7] .............................................. G06F 15/00
(52) U.S. Cl. ....................................... 358/1.12; 358/1.1
(58) Field of Search .......................... 358/1.1, 1.9, 1.11, 358/1.12, 1.13, 1.18, 400, 304; 101/142, 226, 391, 483, 484, 93.07, 19; 400/621, 323, 279; 347/153, 157; 346/24, 50, 78, 94, 141

(56) References Cited

U.S. PATENT DOCUMENTS

| | | | |
|---|---|---|---|
| 3,068,788 A | 12/1962 | Bell | 101/226 |
| 3,593,987 A | 7/1971 | Garber | 270/21.1 |
| 4,211,498 A | 7/1980 | Shimizu et al. | 400/621 |
| 4,283,975 A | 8/1981 | Knoll | 83/76 |
| 4,312,597 A | 1/1982 | Shimizu et al. | 400/621 |
| 4,411,195 A | 10/1983 | Tailleux et al. | 101/226 |
| 4,525,806 A | 6/1985 | Barnes et al. | 358/1.18 |
| 4,558,644 A | 12/1985 | Bunch, Jr. | 101/226 |
| 4,596,546 A | 6/1986 | Schnellenberg | 493/324 |
| 4,685,394 A | 8/1987 | Craemer | 101/484 |
| 4,936,214 A | 6/1990 | Overholser | 101/483 |
| 5,000,812 A | 3/1991 | Murphy | 156/268 |
| 5,293,466 A | 3/1994 | Bringmann | 358/1.15 |
| 5,454,651 A | 10/1995 | Tateyama | 400/323 |
| 5,526,744 A | 6/1996 | Meschi | 101/227 |
| 5,720,223 A | 2/1998 | Meschi | 101/227 |
| 5,842,794 A | * 12/1998 | Zimmermann | 400/138.1 |

* cited by examiner

Primary Examiner—Gabriel Garcia
(74) Attorney, Agent, or Firm—Michael de Angeli

(57) ABSTRACT

A printer/perforator unit for connection to a conventional personal computer allows documents to be conveniently perforated, both printing and perforating functions being controllable in response to a single software program. The single program can be a pre-existing word-processing program modified by addition of software provided together with the printer and perforator unit, a unique word processing program integrally including the perforator control functionality, or another type of program or interacting with a printer, such as a graphics program.

7 Claims, 4 Drawing Sheets

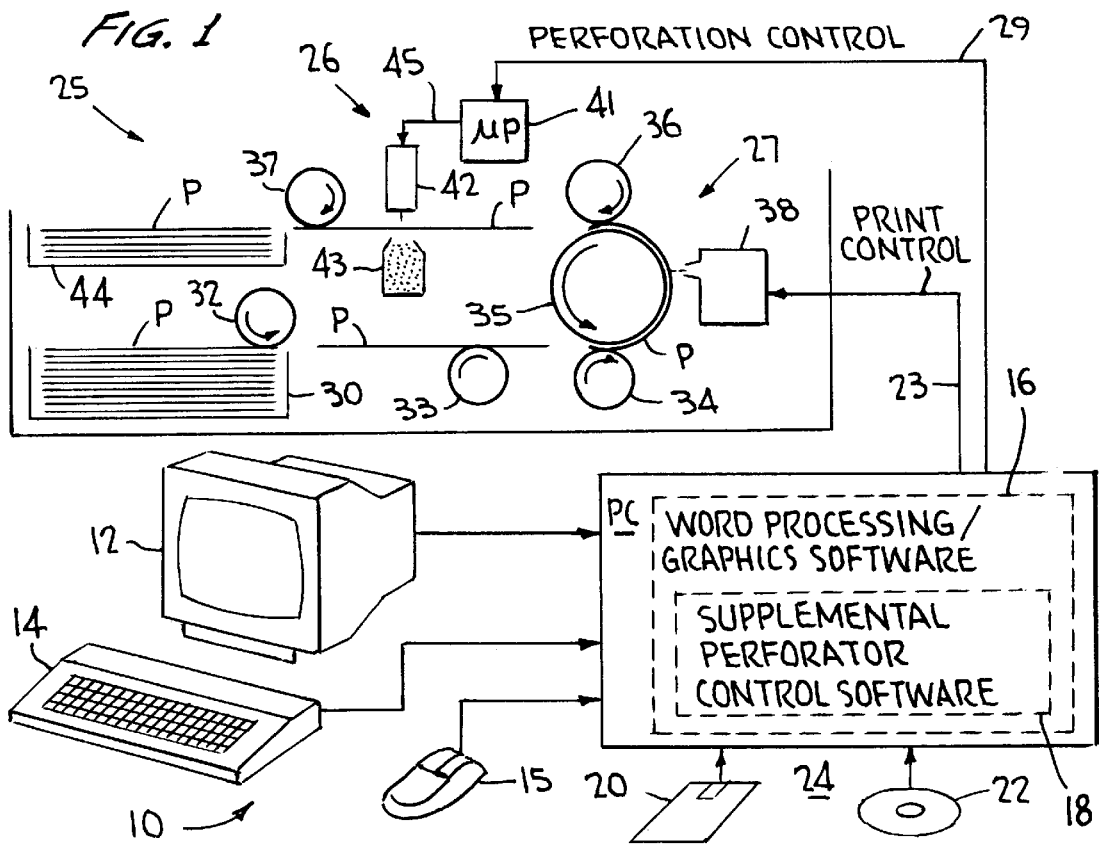
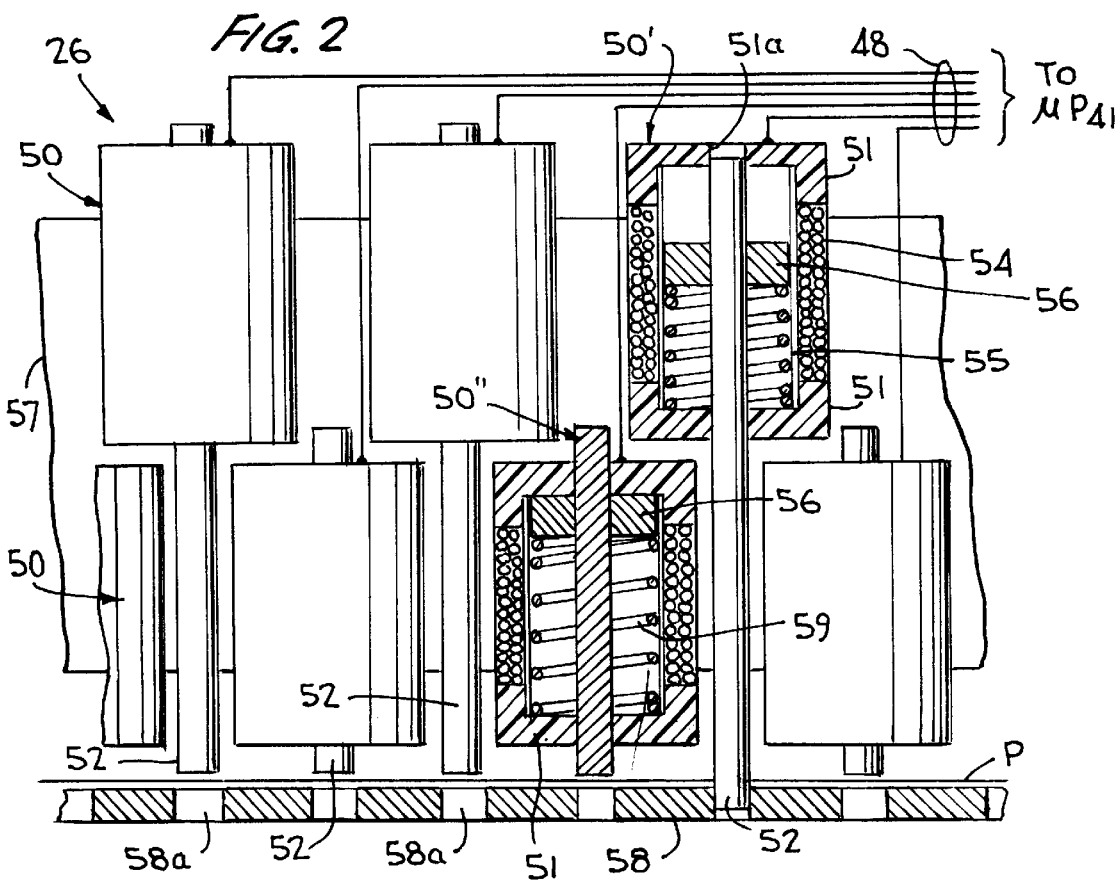

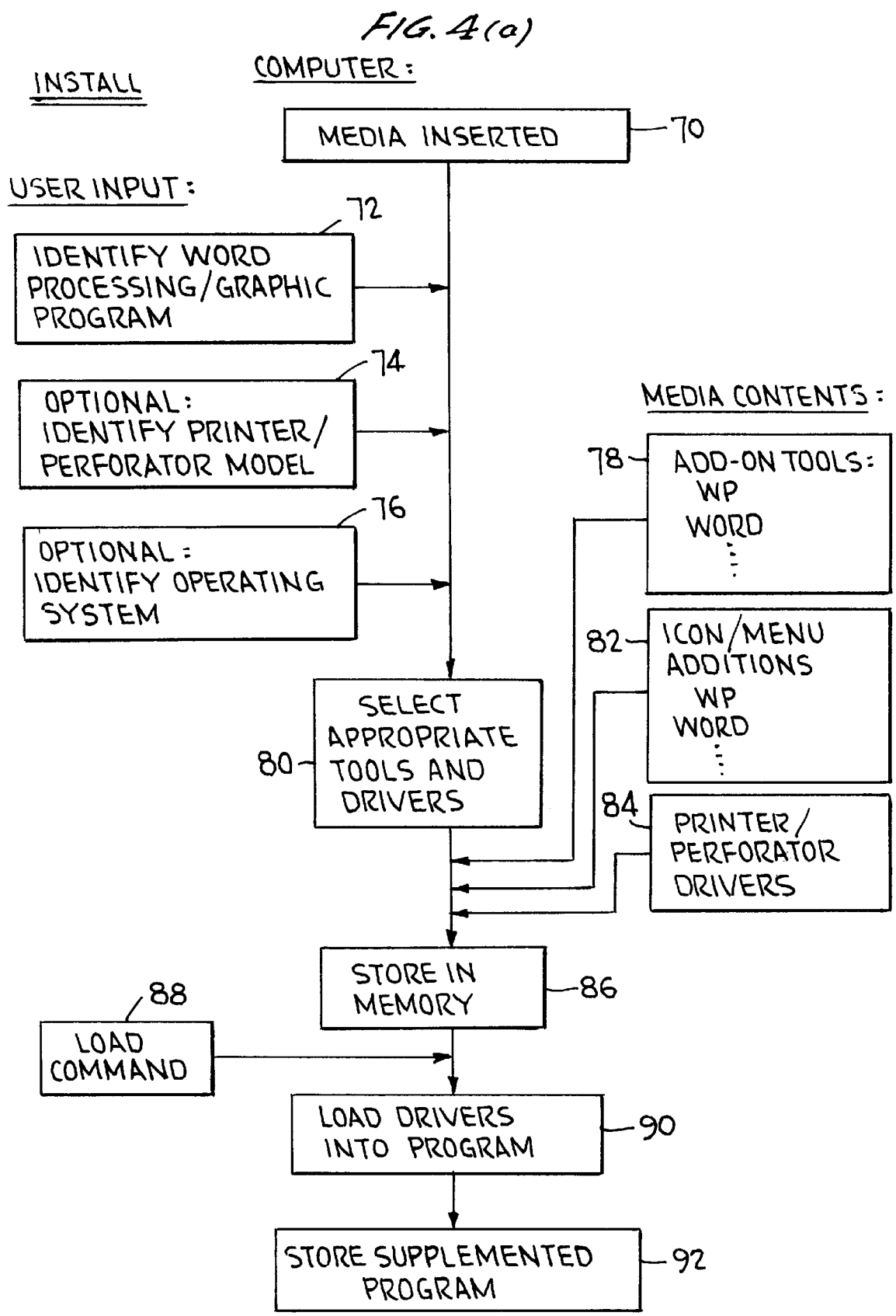

SOFTWARE-CONTROLLED PRINTER/PERFORATOR UNIT

FIELD OF THE INVENTION

This invention relates to computer-controlled printers incorporating perforators, such that documents bearing printed text and/or graphics can conveniently be perforated by the same printer/perforator unit. More specifically, the invention relates to a printer/perforator unit responsive to a personal computer; the perforator is controlled responsive to software provided as a subset of or supplemental to word-processing or graphic software used to control the printing functions of the printer, for similarly controlling the perforation function responsive to operator commands.

BACKGROUND OF THE INVENTION

It is of course well-known to provide printed paper forms and the like with lines or patterns of perforations, so as to facilitate the division of the printed form into various portions. However, as far as known to the present inventor, equipment for thus printing and perforating plain paper stock has normally been relatively heavy-duty, commercial-grade equipment suitable for producing thousands of copies of a single form, all essentially identical (save perhaps for separately-printed serial numbers, on ballots, tickets or the like). Such equipment is far too costly for small-scale use, as might be desired by a small business for billing purposes, or in a school situation, where a single copy or up to tens or hundreds of copies of a given perforated document might be desired. Similarly, such known equipment is not amenable to convenient control of the perforating function, as would be required by relatively untrained users for convenient custom design of forms only a small number of which are needed.

Examples of useful printed and perforated documents that cannot be economically produced using the equipment shown by the prior art include the following:

- small quantities of computer-printed bills, tax forms, mortgage payment books and like communications comprising one or more payment coupons to be returned with the debtor's check;
- communications from school to home requiring return of a signed form, such as field trip permission slips;
- student homework or assignment sheets to be separated and returned as work is completed;
- printing of multiple tickets for raffle drawings or performances on a single sheet of paper, the perforations allowing ready separation. Tickets could be further subdivided by perforations, allowing convenient separation after use;
- notices for community billboards providing a number of tear-off stubs with a telephone number for responding to the notice; or
- invitations for children's parties, e.g., perforated to define the shape of a heart, animal, flower, balloon, clown face or the like, with the invitation data printed within the outline.

Many similar uses will be apparent.

Referring now to prior art showing printing and perforating devices that would not be satisfactory for inexpensive production of small numbers of items as described above, a number of U.S. patents show mechanical devices that simply combine essentially separate and independent printing and perforating functions in a single device, wherein the spatial relationship of the printing and perforating functions with respect to the object being printed is controlled by manual adjustment, if at all. This group of U.S. patents includes Bunch, Jr. U.S. Pat. No. 4,558,644, Tailleux et al U.S. Pat. No. 4,411,195, Shimizu et al U.S. Pat. No. 4,211,498, Shimizu et al U.S. Pat. No. 4,312,597, Bell U.S. Pat. No. 3,068,788, and Overholser U.S. Pat. No. 4,936,214.

U.S. Pat. No. 5,000,812 to Murphy suggests combination of a label cutter with a low-cost electrostatic (i.e., laser) or thermal transfer printer. The Murphy device includes a detector for ascertaining the location of printed labels and providing an appropriate signal to a cutter. However, the spacing at which the cutting of the labels is effected appears to be fixed by the design of the cutting member provided. This system would not allow ready design of custom forms and the like.

Meschi U.S. Pat. Nos. 5,526,744 and 5,720,223 show equipment for transversely perforating a continuous sheet of paper during printing operations; the perforator is computer-controlled responsive to position signals indicative of the position of the paper, and allows documents of different lengths to be produced by varying the spacing of successive perforations. However, Meschi does not teach integration of the control of the printing and perforating functions in a single program suitable for use by nonprofessionals in a low-usage environment; the Meschi equipment is stated to be useful in producing bank statements and other high-volume applications.

The remaining patents are of more general interest. Knoll U.S. Pat. No. 4,283,975 shows an automated cutter for sheet goods. Craemer U.S. Pat. No. 4,685,394 shows a similar device for cutting out cardboard box blanks. Schnellenberg U.S. Pat. No. 4,596,546 shows a device for cutting and creasing paper and cardboard. Garber U.S. Pat. No. 3,593,987 shows apparatus for book making.

Finally, U.S. Pat. No. 5,454,651 to Tateyama, U.S. Pat. No. 4,525,806 to Barnes et al, and U.S. Pat. No. 5,293,466 to Bringmann address various aspects of computer control of printers, none of which incorporate perforators.

OBJECTS OF THE INVENTION

It is therefore an object of the invention to provide a printer/perforator unit, that is, a printer incorporating a controllable perforator, the perforator being controlled by software preferably provided as a subset of or supplemental to software operated on a pre-existing personal computer used to control the printing functions of the printer.

It is a more specific object of the invention to provide perforator-controlling software as a supplement to existing word-processing or graphics software operable by a pre-existing computer, the perforator-controlling software providing additional user interface functions to the existing software, so that a person skilled in using the existing software to produce a document can readily use the supplemented software to add supplemental commands for producing desired perforations into a set of print control commands provided to a printer/perforator unit according to the invention, whereby custom documents incorporating perforations can be economically produced in low volume by persons having only limited additional training in addition to that required to operate the existing software.

It is a further object of the invention to provide a printer responsive to print commands from one or more preexisting software programs that also incorporates a controllable perforator, in combination with software supplementing one or more of the preexisting software programs operable by existing computers.

In particular, it is an object of the invention to add perforator control options and commands to pre-existing software programs in a "user-friendly" manner easily understood by users familiar with the pre-existing software programs, such that entries on user menus, mouse-selectable icons, function keys, and the like, as conventionally provided to control various print functions, are provided corresponding to the perforator control functions of interest.

Other objects of the invention will appear as the discussion below proceeds.

SUMMARY OF THE INVENTION

According to the present invention, a novel printer/perforator unit is provided, both printing and perforating functions being controllable in response to a single user program. The single user program can be a pre-existing word-processing program modified by addition of software provided together with the printer/perforator unit, a unique word processing program integrally including the perforator control functionality, or another type of program for interacting with a printer, such as a graphics program, also including perforator control functions according to the invention.

Typically the printer/perforator unit according to the invention will be provided together with media storing software drivers for adapting each of a number of preexisting word-processing, graphics and other printer-controlling software programs to operate the perforator; in this way, the same printer/perforator unit can be supplied to users having a wide variety of exisiting programs controlling various printers in various ways, while identical media, that is, bearing copies of the same collection of software drivers, can be provided to each user, simplifying distribution and documentation of the software.

The perforator itself according to the invention is provided as a relatively straightforward addition to any of a number of known types of printer mechanisms. In one embodiment, the perforator may be configured as a row of individually actuable perforating devices, operated, for example, by individual solenoids. Typically a platen having a row of corresponding bores formed therein will be disposed opposite the line of perforating devices, to support the paper as it is punched, ensuring formation of clean perforations.

The row of perforating devices is typically arranged along a line transverse to the direction of motion of paper through the printer, that is, parallel to the direction in which lines of type are normally printed. Accordingly, if it is desired to form a line of perforations extending across the document parallel to the normal lines of printing, all of the perforating devices are actuated simultaneously; if it is desired to form a line of perforations perpendicular to the normal lines of printing, the same perforating device can be actuated repeatedly as the paper is passed below the row of perforating devices by the printer's paper transport mechanism. Various other configurations of perforations can be formed by actuation of various combinations of the perforating devices as the paper travels thereby. These and other options are all controlled responsive to the operator's desires, as communicated to the software program through a "friendly" user interface.

Depending on the specific interface between the computer and printer/perforator unit according to the invention, the user's commands may be translated directly into specific perforator commands, that is, to pulses actuating the individual solenoids or other perforator actuating devices, by the software program also according to the invention. However, more preferably the specific perforator commands will be generated by a microprocessor comprised by the printer/perforator unit and responsive to more general commands provided by the program responsive to the user's commands. The latter embodiment, wherein some of the "intelligence" required to operate the perforator is provided in the printer/perforator unit, is preferred because in this way fewer signals need to be passed between the computer and the printer/perforator unit, allowing use of existing computers; in the former embodiment, conventional computer-to-printer connections might not be adequate, meaning that conventional computers would not be adaptable to operate the printer/perforator unit according to the invention.

BRIEF DESCRIPTION OF THE DRAWINGS

The invention will be understood more fully if reference is made to the accompanying drawings, in which:

FIG. 1 shows a block diagram of a printer/perforator unit according to the invention, illustrating its connection to a conventional computer provided with supplemental software according to the invention;

FIG. 2 shows a cross-sectional view through a portion of the perforator unit provided according to the invention;

DETAILED DESCRIPTION OF THE PREFERRED EMBODIMENTS

Figure 3A:
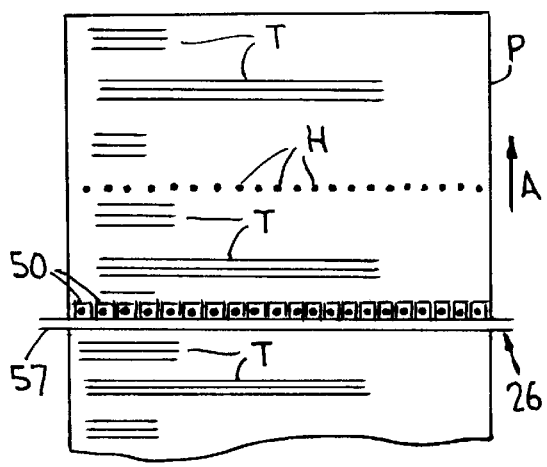
FIG. 3 illustrates schematically the formation of various patterns of perforations on documents and other printed material using the printer and perforator of the invention.
Figure 3B:
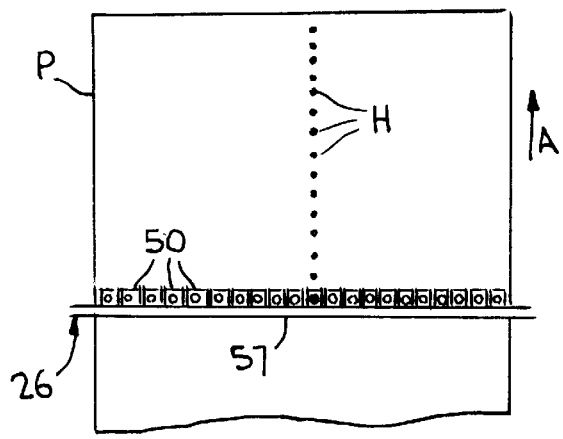
Figure 3C:
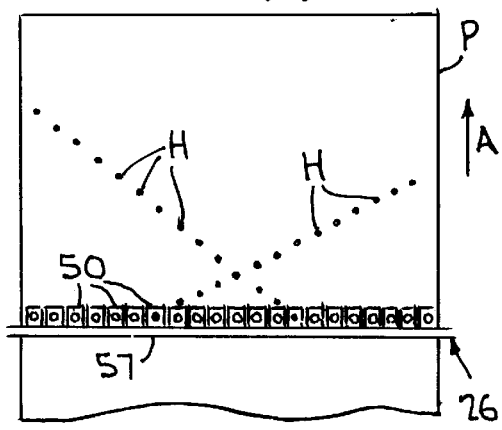
Figure 3D:
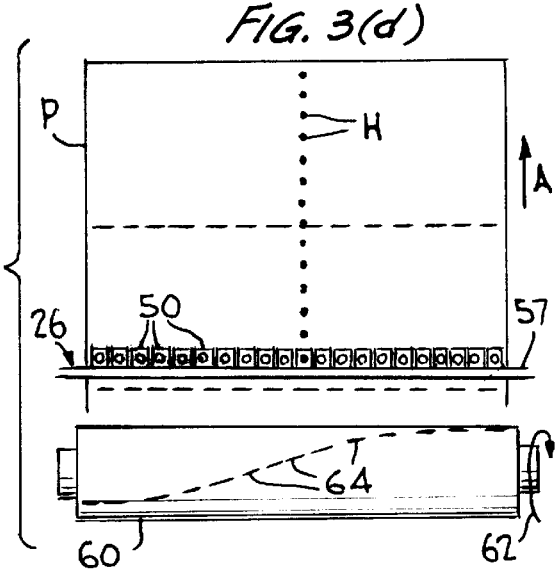
Figure 3E:
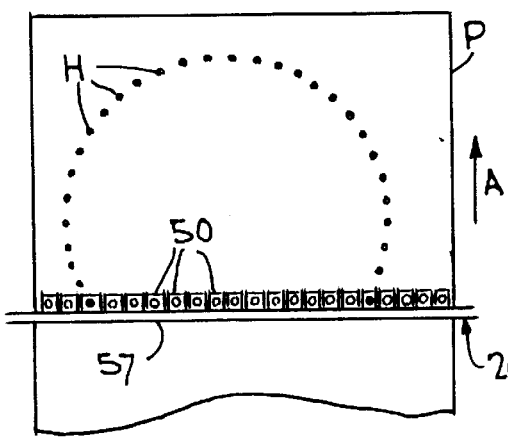
Figure 3F:
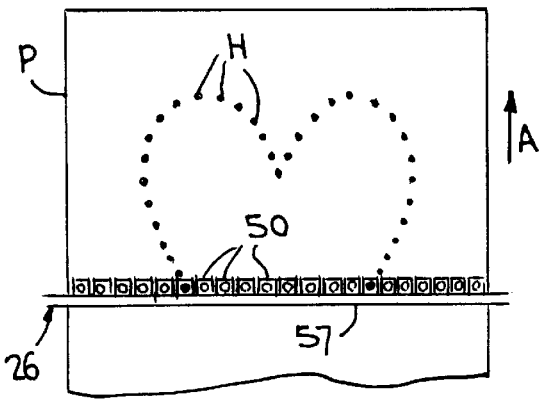

As discussed above, it is an object of the invention to provide a combined printer/perforator unit adapted to be connected to a conventional "personal" computer, using essentially conventional word processing or graphics software to generate printed material to be printed on a sheet of paper, and additional software provided according to the invention to control the perforator so as to permit the convenient and inexpensive production of custom-perforated printed material.

While it is within the scope of the invention to provide such a printer/perforator unit in combination with new software for also controlling all printer functions, and indeed to do so using a unique computer device, in the preferred embodiment the software is provided as a supplement (or "add-on", as the term is used in the art) to one or more existing programs and is operable using a standard personal computer without modification.

More specifically, as is well known in the art, there are currently available a number of different highly sophisticated word processing programs. After grasping the basic principles of the word-processing program, the operator can control many complex variables relating to the printing of text. For example, by selecting various "options" provided on "menus", by selecting "icons" using a "mouse" or similar pointing device, and by pressing various combinations of "alphanumeric", "control" and "function" keys (the terms in quotation marks being well-understood by those of skill in the art), relatively unskilled operators can readily control many highly sophisticated aspects of document production and printing.

For example, using WordPerfect, one well-known word processing program, the user by selecting appropriate icons can print characters in bold, italic, sub- or super-scripted, or underlined type; by choosing items from a menu, can select from hundreds of type fonts in various sizes; can select from long tables of various linguistic, scientific, typographic or pictorial characters; can indicate that a document is to be printed on paper of various sizes, or on an envelope or shipping label, and then control an associated printer to request (by screen display) supply of the appropriate stock; and can control various other aspects of printing, all in a very convenient and user-friendly fashion. The user can even create a customized "toolbar", wherein common functions, such as the specifications required to properly format a letter, facsimile, postcard, or legal document are automatically added to a new document by selection of a single icon.

It is well-known, of course, that the word-processing programs providing these various sophisticated features require immense amounts of programming time and effort, so that it would be highly undesirable to attempt to provide a new printer control feature, e.g., perforation, that could not be integrated conveniently with existing word processing programs. Similarly, users develop substantial expertise in using these programs, so that it would be undesirable to seek to add a new function in a manner that would require users to become accustomed to a totally new word-processing program.

For generally similar reasons, the same word-processing programs may be operable on computers of several different types (or at least on several generations of computers using succesive iterations of the same operating system), and used to control printers of varying types made by numerous manufacturers; the word-processing program is "customized" to the particular computer and printer combination upon purchase by selection and storage of one or more appropriate software "drivers" normally provided with the printer. Thus, after selection and loading of the appropriate software drivers, each user sees essentially the same sequence of interface "screens" regardless of the combination of computer and printer involved. This practice maximizes product lifetime, improving profit earned by the software publisher, and allows expertise developed by a user to be transferred when upgrading from one combination of printer and computer to another, for example.

The same considerations are present in the case of adding additional control features such as perforation to other types of software used to control printing, such as software used to produce graphic illustrations and the like. Accordingly, where reference is made herein to word processing software per se, this should be understood to include such additional classes of software principally intended to allow convenient user control of complex printing functions, unless the context indicates to the contrary.

As discussed above, there is not available, so far as the inventor is aware, nor shown in the prior art of which the inventor is aware, a printer device controllable by software operating on a personal computer to perforate a printed document, so as to allow the operator to conveniently generate perforated printed forms; that is, there is not available the combination of a printer/perforator unit operable using existing word processing software to generate the desired text, illustrations, and so on, with control of the perforating feature provided in a user-friendly and convenient fashion integrated with the existing word-processing software.

Therefore, according to an important aspect of the present invention, perforator control software is added to pre-existing word processing software such that the option to add perforating commands is "seen" by the operator in the same manner the operator "sees" the various commands provided by the pre-existing word processing software to control printing. Stated differently, according to the invention, perforator control commands are added to the menus and/or icons of the existing word processing software used by the user to select various printer control options. The accompanying printer/perforator unit according to the invention responds to these perforation control commands and perforates the paper accordingly, in the same sequence as the printing itself.

FIG. 1 shows schematically the principal components in a system according to the invention, while FIG. 2 shows a cross-section through an exemplary perforating head added to a printer according to that aspect of the invention.

Thus, in FIG. 1 there is illustrated a conventional personal computer ("PC") 10, typically comprising a display unit 12, a keyboard unit 14, and a mouse 15, and other components, all as generally conventional. The personal computer 10 operates using essentially conventional word processing software indicated at 16 to which is added perforator control software 18 according to the invention.

More specifically, in the preferred implementation of the invention, the user is supplied with a novel printer/perforator unit 25 comprising a printer assembly 27, which itself may be of generally conventional design and responsive to print control commands provided by word processing software 16, as indicated at 23, and a perforator 26, responsive to perforation control commands 29 provided by supplemental perforator control software 18. The user is simultaneously supplied with the supplemental perforator control software 18 on a conventional computer-readable medium, e.g., a floppy disk 20 or a CD-ROM 22. The user then connects the novel printer/perforator unit 25 to the usual printer port of PC 10, and inserts the media supplied to PC 10 as indicated at 24. The usual software installation process then follows, whereby the user is prompted by questions displayed on display 12 to enter via keyboard 14 or mouse 15 such information as the correct combination of word-processing software 16, PC 10, and possibly the model of printer/perforator unit 25. The appropriate software drivers are then downloaded from media 20 or 22 and stored in PC 10. Menu options, icons, and the like are added to the user interface provided on display 12 by the word-processing software 16, allowing the user to then select the perforating option and to specify the location, orientation, spacing, and the like of perforations desired as part of the document created using the word-processing software 16. Additional print control functions may also be added. This process is further detailed with reference to FIG. 4 below.

Thus, a teacher desiring to provide a test paper with a detachable answer slip might prepare the text of the questions on the upper half of the page, and define spaces for checking boxes in response in the lower half of the page. He or she might then define a transverse perforation extending therebetween, to allow the students to detach the answer portion and hand it in separately. Similarly, a small-business owner could use a computer operating a billing program to generate bills for a number of clients, and to perforate each bill to define a payment coupon to be returned with the customer's check. Municipalities might similarly generate tax bills with readily detached payment coupons. Schools could provide readily detachable permission slips integrally with letters home advising of an upcoming field trip. Persons with goods to sell could generate advertisements for posting on community bulletin boards, one or more edges of each comprising a number of readily-detached slips defined by perforations and bearing the relevant information and telephone number. Tickets for school performances and other events not justifying the cost of commercial ticket printing could readily be provided by operating the perforator/printer unit to print the relevant information, corresponding, for example, to six or eight individual tickets on a single sheet of paper, defined by perforations for ready separation. It is within the scope of the invention to also provide additional print control functions to pre-existing word-processing and other programs so as to control the printer to print differing text on each ticket, such as sequential ticket numbers, or individual seat identification. Each ticket could also be subdivided into a main portion and a stub, to be separated upon use. Invitations to children's parties could be provided in various amusing shapes by perforating paper stock in a desired outline shape, and printing the relevant information within the outline.

Numerous other uses for the printer/perforator unit of the invention, provided together with software to allow convenient user control of the perforator function, and possibly also to add additional printer control functions to pre-existing software (as noted, for example, to allow a word-processing program to conveniently print sequential ticket numbers or seat identifying information on tickets) will occur to those of skill in the art.

In essence, the novel printer/perforator unit 25 of the invention comprises a printer mechanism 27, which may itself be novel or selected from any of several conventional classes, and a perforator mechanism 26, added according to the invention. In the exemplary diagram of FIG. 1, printer mechanism 27 comprises a cassette 30 containing sheets of paper P, a paper transport mechanism indicated schematically by rollers 32–37 for moving the sheets of paper P through the printer mechanism 27, a printing head 38 responsive to print control signals 23, and a paper output tray 44. Printing head 38 may be novel, or may be of any known type suitable for relatively low-volume use responsive to computer control, e.g., ink-jet, electrostatic or "laser", dot-matrix, or others.

In the exemplary, non-limiting embodiment shown, the perforator mechanism 26 added according to the invention comprises a perforator head 42, comprising an array of individually-actuable perforator devices (discussed further in connection with FIG. 2) extending transverse to the direction of travel of paper through the printer/perforator unit 25, a bin 43 for catching perforations, and (preferably) a microprocessor ("μP") 41 for responding to perforator control commands 29 provided by perforator control software 18 by actuating the individual perforator devices. However, other types of perforator mechanism are within the scope of the invention; for example, the roller-type perforators shown in various prior art patents referred to above might be useful to form transverse perforations, while individually-actuable perforator devices could also be provided to form perforations in other patterns. See FIG. 3, discussed below.

It will be appreciated that as the print control functions provided by the existing word processing software 16 are not necessarily affected by the perforator control function, the perforating of a given sheet of paper P need not take place subsequent to printing, as indicated in FIG. 1; it is within the scope of the invention to perform perforating before or simultaneously with printing. Similarly, mention that the printer could be any of a conventional laser printer, inkjet printer, or dot-matrix printer should not be considered to limit the invention to these three types per se.

As indicated, preferably the perforator mechanism 26 comprises a microprocessor 41 for providing individual control signals to individually-controllable perforator devices; that is, microprocessor 41 responds to relatively generic perforator control signals provided at 29 by perforator control software 18, such as signals indicating the paper P is to be divided into quadrants by perpendicular lines of perforations, by generating appropriate individual control signals indicated at 45 for the perforating devices. It is also within the scope of the invention to configure the perforator control software 18 to provide these individual control signals 45; however, this might require more elaborate connections between the PC 10 and the printer/perforator unit 25 than are provided by conventional PCs. Hence generation of the individual perforator control signals 45 by "intelligence" provided in the printer/perforator unit 25 is preferred. It will also be appreciated that microprocessor 41 could be integral with a microprocessor also controlling the printing mechanism 27 responsive to print control signals 23, i.e., that a single microprocessor would perform both functions.

FIG. 2 shows in partial elevation and cross-sectional view a portion of an exemplary perforator head 26 comprising a row of individually-actuable perforator devices 50, supported by a support member 57 so as to be spaced uniformly along a line extending transverse to the direction of travel of the paper P through the printer mechanism 27, as indicated in FIGS. 1 and 3. Each of the individually-controllable perforator devices 50 includes a male perforating member 52 operated responsive to individual perforator control signals 45 received from microprocessor 41, as indicated by connecting conductors 48. A first one of the perforator devices 50' is shown in the activated, i.e., perforating position; a second 50" is shown in the inactive position. As shown, alternating ones of the perforator devices 50 may be staggered vertically, allowing reduction of the spacing between adjacent perforating members 52.

In the embodiment shown, which is only exemplary, each of the individually-controllable perforator devices 50 comprises a perforating member 52 driven by an actuating device, implemented, for example, as a solenoid comprising a coil of wire 54 wrapped on a former 55 capped by end members 51. End members 51 define bores 51a through which the perforating members 52 slide axially. A paramagnetic element 56 (e.g., an iron bobbin) is fixed to or integral with each perforating member 52. In response to a perforator control signal, a pulse of current is applied to coil 54, causing coil 54 to exert a magnetic field, drawing the magnetic element 56 into the solenoid 54 and urging the perforating member 52 downwardly in the view of FIG. 2, perforating the paper P. When the pulse of current ends, a return spring 59 urges the assembly of magnetic element 56 and perforating member 52 upwardly, to the inactive position. Preferably, the perforating devices 50 are disposed opposite a platen 58 having a number of holes 58a formed therethrough disposed opposite the male perforating members 52; the holes 58a in platen 58 thus form female die members through which the male members 52 pass, supporting the paper P during perforation and ensuring clean edges to the perforations thus formed.

As shown, the perforating devices 50 may be provided with perforating members 52 of differing lengths so that they can be conveniently nested closely together in two vertically-staggered rows, while permitting the actuating solenoids to be relatively wider. However, numerous other arrangements are also considered to be within the scope of the invention. For example, the perforating members might be relatively elongated, knife-like members, ovoid or elliptical in cross-section, and cooperate with similarly-shaped apertures in the platen 58 rather than the generally cylindrical perforating members 52 shown. In that case, the perforating devices might be conveniently arranged in a single row and still provide sufficiently closely spaced perforations to allow ready separation of the sections of the paper P while permitting adequate space for the components of the actuating devices.

It is also within the scope of the invention to dispose the actuating elements away from the perforating elements themselves so as to provide more space for the actuating elements; for example, the perforating elements might be provided as simple punch members supported for vertical motion, and pivotally connected at their ends away from platen 58 to first ends of pivoted levers; alternate ones of the levers could extend in opposite directions, be pivoted about spaced parallel axes, and have their opposed ends pivotally connected to two spaced rows of actuating solenoids, similar to those shown in FIG. 2. Another option would amount to staggering the perforating device 50 laterally, that is, arranging them in two or more parallel rows disposed transverse to the direction of travel of the paper through the printer mechanism, providing adequate lateral spacing for the perforating elements 52.

Other arrangements are similarly within the scope of the invention; for example, as mentioned above, a computer-controlled roller-die perforator assembly as shown in the Meschi or Murphy patents discussed above could be provided to form rows of perforations perpendicular to the direction of travel of the sheets of paper P through the printer/perforator unit, with individually-actuated perforating members as in FIG. 2 provided to form lines of perforations extending other than transverse to the direction of travel of the paper P. See FIG. 3(*d*).

As indicated, typically the row of perforating devices 50 will extend transverse to the direction of travel of the paper P through the printer, such that if it is desired to form a row of perforations extending across the paper P, all of the perforating devices 50 will be actuated simultaneously. Alternatively, if it is desired to form a line of perforations extending parallel to the direction of travel of the paper through the printer, the same perforating device can be energized at relatively high frequencies synchronized with the motion of the paper P, so as to punch a series of holes in a given pattern. These and various other patterns of perforations may be formed by the individually-actuable perforating devices, responsive to perforation control signals 29 generated responsive to user commands, entered in response to options offered by the perforator control software 18.

FIG. 3, comprising FIGS. 3(*a*)–(*f*), shows a number of examples of use of the perforator/printer unit of the invention to form differing patterns of perforations on a sheet of paper P responsive to user commands. In each, a plurality of perforator devices 50 are shown supported by member 57 above the paper P. As discussed, the perforator devices 50 may be individually energized responsive to user commands to produce desired patterns of perforations. (It should be understood that many more individual perforator units 50 will preferably be provided than are shown in FIG. 3, which is schematic only, to allow close spacing of perforations, and formation of relatively complex patterns thereof.)

The actuation of the individual perforator devices 50 is controlled by microprocessor 41 in synchronism with the motion of the paper P through the unit, as indicated by arrow A. Microprocessor 41 is accordingly functionally connected to paper transport mechanism indicated by rollers 32–37 (FIG. 1), to ensure the proper location of the perforations with respect to the paper P and text or other material printed thereon, as indicated at T.

For example, FIG. 3(*a*) shows provision of perforation control signals by the perforator control software 18 to each of the perforator devices 50 simultaneously, to cause a line of perforations H to be perforated through the paper P transverse to the direction of motion of the paper P through the printer/perforator unit.

In FIG. 3(*b*) the same perforator 50 is repeatedly activated as the paper P moves thereunder so as to punch a line of perforations through the paper in the direction of its travel. The patterns of FIGS. 3(*a*) and (*b*) could also be combined, for example, to divide a sheet of paper into four or more sections.

FIG. 3(*c*) shows controlling the perforators sequentially to produce lines of diagonal holes H; that is, successive ones of the perforators are actuated at regular intervals as the paper P moves thereby, to produce straight lines of perforations. If non-linear patterns are desired, as in the circle pattern of FIG. 3(*e*) or the heart of FIG. 3(*f*), the rate of actuation of the perforators 50 varies along the extent of the paper P. Provision of perforator control software 18 allowing convenient user input permitting control of the perforators to produce these and numerous other patterns is well within the skill of the art, as will be apppreciated given the sophistication of modern graphics and other printer control software.

FIG. 3(*d*) shows a further alternative, where a roller perforation die 60 is provided in addition to the individually actuable perforators 50. Roller die 60, which may be implemented generally as shown in the Meschi and Murphy patents, is driven to rotate as indicated by arrow 62 by a motor (not shown) responsive to perforator control signals 29 as paper P passes thereunder, and comprises a number of perforating members 64 arranged in a spiral pattern to produce a straight transverse line of perforations as the paper P passes thereunder. This alternative might be useful in the event extensive transverse perforations were called for.

As discussed above, in general it will be convenient to provide the software required to implement the perforator control functions as an add-on to preexisting word processing, graphics, or other programs, such that a user would purchase a printer/perforator unit according to the invention along with a computer-readable storage medium, such as a floppy disk or CD-ROM, storing appropriate word processing add-on software providing the perforator control functions. However, other implementations of the invention, such as providing the printer/perforator unit according to the invention together with integrated software providing word processing and perforating functions, are also within the scope of the invention. It is also within the scope of the invention to similarly provide additional printer control functions, such as printing of sequential ticket numbers or seat identification information, to pre-existing word-processing or other printer control software.

FIG. 4, comprising FIGS. 4(*a*) and (*b*), provides exemplary block diagrams of the sequence of steps involved in selecting and loading appropriate software add-ons to supplement a preexisting word-processing or graphics program so as to provide integrated control of the printer/perforator unit of the invention, and of their subsequent operation. It should be understood that these block diagrams are not intended to serve as a guide for programming, merely to suggest to those of skill in the art certain considerations involved in implementing this aspect of the invention. However, it is believed that such implementation is well within the skill of the art. In particular, the process of supplementing existing software by providing "add-ons" to provide additional functionality, and to provide additional user interface options, such as icons, menu additions, and the like, to allow the user to define the precise functions desired, is very well-known.

FIG. 4(a) shows the principal steps in the installation of software add-ons supplementing a preexisting program. In FIG. 4(a), the elements extending down the left side of the drawing exemplify user input steps; the elements in the center of the drawing are steps carried out by the PC; and the block on the right side shows the principal components of the software provided on the media supplied with the printer/perforator of the invention.

Thus, the process begins with insertion of the media at 70. The user is then prompted to provide input as needed, including identification of the word processing, graphics, or other programs to be supplemented according to the invention, at 72. The user may also be required to identify the precise model of printer/perforator unit to be supported, as indicated at 74, and the operating system, as indicated at 76.

As indicated at 78, the contents of the media include certain add-on tools, that is, software allowing supplemental user icons and menu items to be integrated into the various programs supported. Several known word-processing programs are identified at 78; these are indicative of a large number of programs of various types that may thus be supplemented. The add-on tools corresponding to the program identified by the user in step 72 are copied to the computer, and used in step 80 to select appropriate tools and drivers from the media as indicated at 82, that is, to copy software needed to cause the program to display the icons, menu items and the like needed to allow the user to specify the perforation patterns desired, and to provide appropriate control signals to the perforator. As noted, it is also within the scope of the invention to similarly provide additional printer control functions to pre-existing word-processing or other printer control software, for example, allowing the user to conveniently direct printing of sequential ticket numbers or seat identification information; stated more generally, such supplemental software allows the user conveniently to specify variation in textual material printed on successive copies of a document. Where the same media contains software corresponding to several printer/perforator units, as indicated at 84, the correct software is similarly provided. It is also within the scope of the invention to provide the supplemental software add-ons by downloading, i.e., by encouraging the user to contact an Internet address and select the appropriate software needed to allow his or her preexisting program to properly operate the printer/perforator of the invention; this process is also well understood.

When the appropriate tools and drivers have thus been copied to the computer memory, as indicated at 86, the user will typically be asked to confirm his or her choices; if they are appropriate, the user will give a LOAD command, as indicated at 88, after which the drivers will be loaded into the word-processing, graphics, or other program, at 90; the supplemented program can then be stored for subsequent use, at 92.

Figure 4B:
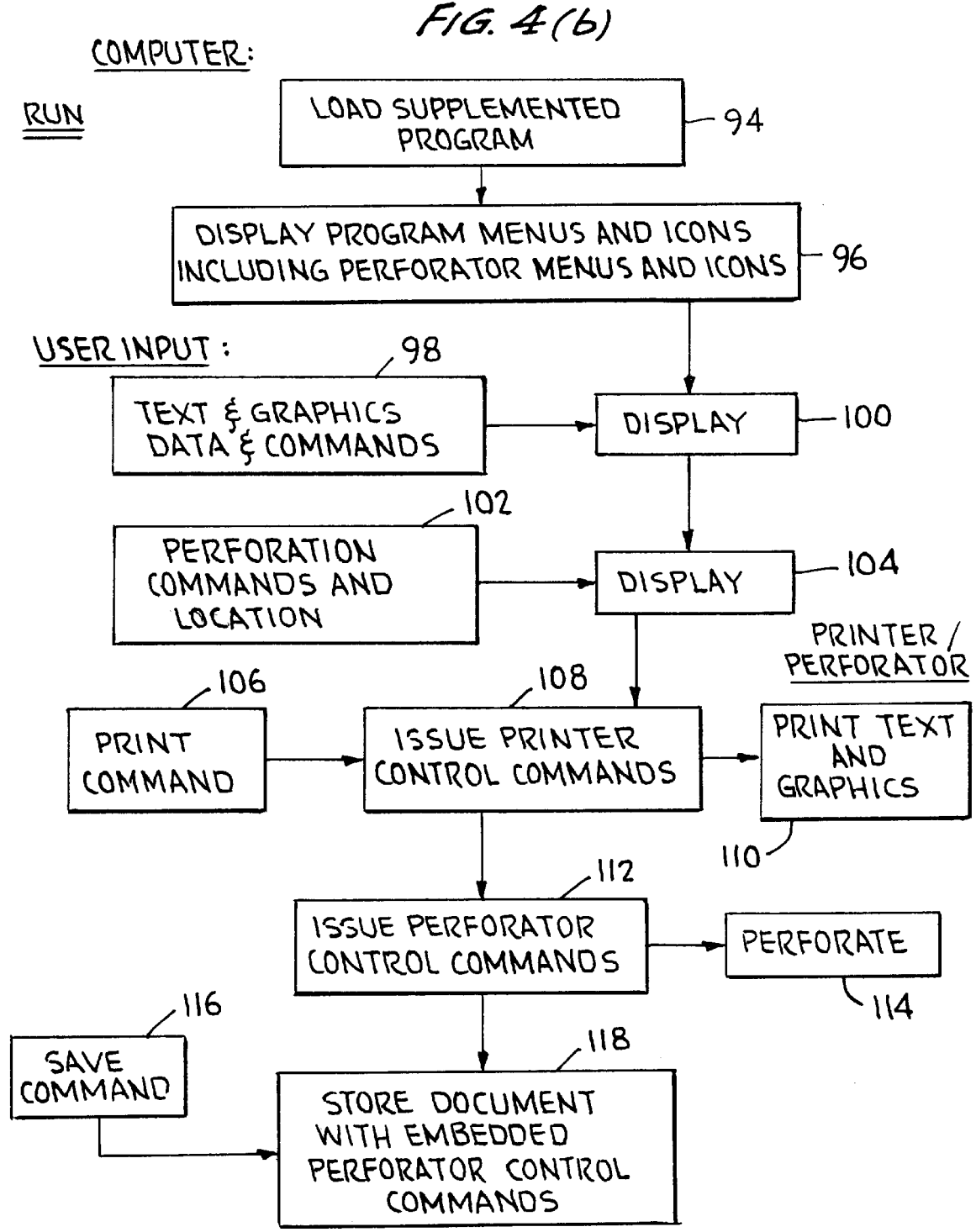
FIG. 4 provides an exemplary flow chart of perforator driver software provided to supplement pre-existing word-processing or graphics software, such that the latter is then enabled to accept operator commands for operation of the perforator according to the invention.

FIG. 4(b) shows a similar exemplary block diagram of the steps in controlling the printer/perforator unit of the invention. In this Figure, the elements extending down the left side of the drawing again exemplify user input steps, and the elements in the center of the drawing are steps carried out by the PC, as in FIG. 4 (a). However, in FIG. 4(b) the steps on the right side are carried out by the printer/perforator unit.

The process begins at 94 with the loading of the supplemented program. The computer then displays the usual program menus and icons, including those provided to allow the user to specify and define patterns of perforations desired, as indicated at 96. Thereafter, at 98, the user inputs text, graphics, and the like, using the pre-existing program in the usual way to define the print control commands needed to cause a desired document to be printed; the document thus defined is displayed at 100, also as usual.

According to an important aspect of the invention, as indicated at 102 the user also may provide perforation commands; the locations thus specified are illustrated on the display, together with the textual and graphic material previously input, as indicated at 104.

In particular, and in distinction to the prior art, wherein the locations of perforations were defined only with reference to the edges of the paper itself, according to the invention the user can define the locations at which the document is to be perforated by reference to text, graphics and the like already input. Stated differently, typically the user will first define the textual and graphical material to be printed, and will then simply locate the respective position at which perforation is desired with respect to this material by indicating a location on the display using the mouse or the like. Thus the user is insured that the perforations will not (for example) extend through a continuous paragraph of text, as might occur if the perforations were located simply by reference to the periphery of the paper itself. Moreover, of course, in this way the definition of the location and pattern of perforation is far simpler, and requires much less user education, than provided by the prior art. According to the invention, perforation is effectively provided as another option offered by the word-processing or graphics program, and may be selected by the user much as are the other options offered.

Completing the discussion of FIG. 4(b), when the user is satisfied with the relative locations of the perforations and textual and graphical material as illustrated on the display, he or she may provide a PRINT command, as indicated at 106. The computer then issues printer control commands, as indicated at 108; these are used by the printer/perforator unit to print the text and graphics in the usual way, at 110. Perforator control commands are then issued, at 112, and perforation performed at 114. As indicated above, the printing and perforating steps may be be performed in either order, or simultaneously, within the scope of the invention.

Finally, if the user then provides a SAVE command, as indicated at 116, the document is stored by the computer at 118 in the usual manner, with the perforation control commands embedded therein, for later use as desired.

As indicated above, the invention may be implemented in a wide variety of ways. While a preferred embodiment of the invention has been shown and described, numerous modifications, additions, and improvements may be made thereto without departure from the spirit and scope of the invention, which is therefore not to be restricted by the above exemplary disclosure, but only by the following claims.

What is claimed is:

1. In combination, a printer/perforator unit comprising a print head for responding to word processing or graphics commands received from a word processing or graphics software program operated by an associated computer device to print specified text aid/or graphical material on paper, and a perforator responsive to perforation commands also received from said word processing or graphics software program operated by said associated computer device to perforate said paper, and word processing or graphics software program accepting user inputs defining said specified text and/or graphical material and defining the locations and patterns of perforations to be formed, and wherein said word processing or graphics software program is adapted to cause a display operated by said computer device to display symbols indicative of the locations and patterns of said perforations in relation to displayed locations of said specified text and/or graphical material.

2. The combination of claim 1, wherein a portion of said word processing or graphics software program accepting user inputs defining the locations and patterns of perforations to be formed, and adapted to cause a display operated by said computer device to display symbols indicative of the locations and patterns of said perforations in relation to displayed locations of said specified text and/or graphical material, is configure as a supplement to a pre-existing word processing or graphics software program for accepting user inputs defining said specified is text and/or graphical material.

3. The combination of claim 2, wherein said pre-existing word processing or graphics software program for accepting user inputs defining said specified text and/or graphical material causes menu items and icons to be displayed for allowing the user to select options defining said text and/or graphical material, and wherein said supplemental portion of said word processing or graphics software program accepting user inputs defining the locations and patterns of perforations to be formed causes additional menu items and icons allowing the user to select the positions and patterns of said perforations to be similarly displayed to ether with the menu items and icons displayed by said pre-existing word processing or graphics software program.

4. The combination of claim 3, wherein said supplemental portion of said word processing or graphics software program is supplied on a computer-readable medium supplied together with said printer/perforator unit.

5. The combination of claim 4, wherein plural versions of said supplemental portion of said word processing or graphics software program, corresponding to various pre-existing word processing or graphics software programs for accepting user inputs defining said specified text and/or graphical material, are provided on said computer-readable medium.

6. The combination of claim 5, wherein the version of the supplemental portion of said word processing or graphics software program corresponding to a particular pre-existing word processing or graphics software program may be integrated and stored with said pre-existing word processing or graphics software program.

7. The combination of claim 2, wherein said supplemental word processing or graphics software program further permits a user to specify variation in textual material printed on successive copies of a document.

\* \* \* \* \*